US006325326B1

United States Patent
Pancotti

(10) Patent No.: US 6,325,326 B1
(45) Date of Patent: Dec. 4, 2001

(54) CYCLIC AND COLLECTIVE PITCH CONTROL DEVICE FOR A HELICOPTER ROTOR

(75) Inventor: Santino Pancotti, Gallarate (IT)

(73) Assignee: Agusta S.p.A. (IL)

( * ) Notice: Subject to any disclaimer, the term of this patent is extended or adjusted under 35 U.S.C. 154(b) by 0 days.

(21) Appl. No.: 09/511,179

(22) Filed: Feb. 22, 2000

(30) Foreign Application Priority Data

Feb. 26, 1999 (IT) ............................... TO99A0149

(51) Int. Cl.[7] ................................. B64C 27/605
(52) U.S. Cl. ......................... 244/17.25; 416/114
(58) Field of Search ........................... 244/17.25, 17.27; 416/114, 115, 116, 134 A, 148

(56) References Cited

U.S. PATENT DOCUMENTS

| | | | |
|---|---|---|---|
| 3,841,586 | * 10/1974 | Broadley et al. | 244/17.25 |
| 3,972,491 | * 8/1976 | Ferris et al. | |
| 4,361,415 | * 11/1982 | Aubry. | |
| 4,375,940 | 3/1983 | Lovera et al. | |
| 6,033,182 | * 3/2000 | Rampal. | |

FOREIGN PATENT DOCUMENTS 2 771 708   6/1999   (FR) .

OTHER PUBLICATIONS

English Translation of Abstract from France Patent Document 2 771 708 dated Jun. 4, 1999 (see above).

European Search Report for European Application No. EP 00 10 3643, completed Nov. 17, 2000.

* cited by examiner

Primary Examiner—Peter M. Poon
Assistant Examiner—Tien Dinh
(74) Attorney, Agent, or Firm—Pitney, Hardin, Kipp & Szuch, LLP

(57) ABSTRACT

A cyclic and collective pitch control device for a helicopter rotor, fitted about a fixed casing having an axis, and having a substantially sleeve-shaped movable element fitted in axially-sliding manner to the casing; a rocking-plate assembly fitted coaxially to the movable element so as to rock in any direction with respect to the movable element, and in turn having an angularly-fixed first annular element, and a second annular element rotating on the first annular element together with a drive shaft of the rotor fitted through the casing; supporting and actuating means cooperating with the first annular element to move the assembly and the movable element jointly along the axis with respect to the casing, and to rock the assembly with respect to the movable element; and prismatic connecting means between the movable element and the casing to prevent angular displacement of the movable element with respect to the casing.

6 Claims, 2 Drawing Sheets

CYCLIC AND COLLECTIVE PITCH CONTROL DEVICE FOR A HELICOPTER ROTOR

The present invention relates to a cyclic and collective pitch control device for a helicopter rotor.

BACKGROUND OF THE INVENTION

Cyclic and collective pitch control of known helicopter rotors is normally effected by rocking-plate control devices substantially comprising two concentric rings, the outer one of which is supported for rotation, by means of bearings, by the inner ring, and is connected angularly to a drive shaft to rotate a number of pitch-change rods, each hinged eccentrically to a respective blade.

In such rotors, the inner ring is carried coaxially by a substantially sleeve-shaped movable element in turn fitted in axially-sliding manner to a fixed pylon, through which the drive shaft extends in axially-fixed, angularly-free manner.

The movable element is defined by a spherical annular outer surface mating with a spherical seat on the inner ring; and the inner ring is normally secured to the movable element by two bolts fitted through respective radial holes in the inner ring and each engaging a respective key in turn engaging in sliding manner a respective substantially vertical slot formed on the outside of the movable element, so that the inner ring is locked angularly to the spherical annular surface of the movable element and, by virtue of the key and slot, is permitted to rock in any direction, with respect to the movable element, about the center of the spherical annular surface.

Known control devices also comprise a number of hydraulic actuators equally spaced about and extending substantially parallel to the drive shaft, and which cooperate with and exert thrust on the inner ring to move the inner and outer rings and the movable element axially and jointly with respect to the pylon, and to rock the inner and outer rings, with respect to the movable element, about axes substantially perpendicular to the axis of the drive shaft.

Finally, the inner and outer rings are secured respectively to the drive shaft and pylon by a first and second compass-type connecting mechanism, each defined, as is known, by two connecting rods secured to each other by a cylindrical hinge. The first connecting mechanism is designed to prevent angular displacement of the inner ring and the movable element about the drive shaft axis and with respect to the pylon, and the second connecting mechanism to transmit rotary motion from the drive shaft to the outer ring.

Though valid in terms of performance, compass-type connecting mechanisms of the above type are relatively heavy and expensive, and, being subjected, in use, to reciprocating loads which tend to increase the clearance between the connecting rods, need to be lubricated and checked continually. Moreover, to conform with constraint redundancy requirements typical of aircraft applications, the number of connecting mechanisms must be doubled, thus compounding the aforementioned drawbacks.

SUMMARY OF THE INVENTION

It is an object of the present invention to provide a cyclic and collective pitch control device for a helicopter rotor, which is cheap to produce, reliable, lightweight and, in particular, features a small number of compass-type connecting mechanisms as compared with the aforementioned known devices.

According to the present invention, there is provided a cyclic and collective pitch control device for a helicopter rotor fitted to a drive shaft having a longitudinal axis; said device being carried by a fixed supporting element coaxial with said longitudinal axis, and comprising:

a movable element coaxial with said longitudinal axis and fitted in axially-sliding manner to said supporting element;

a rocking-plate assembly coaxial with said longitudinal axis, fitted to said movable element so as to rock, with respect to the movable element, about transverse axes substantially perpendicular to said longitudinal axis, and in turn comprising an angularly-fixed first annular element, and a second annular element rotating on said first annular element together with said drive shaft;

supporting and actuating means cooperating with said first annular element to move said rocking-plate assembly and said movable element jointly along said longitudinal axis with respect to said supporting element, and to rock said assembly, with respect to said movable element, about said transverse axes; and constraint means for preventing angular displacement of said movable element, with respect to said supporting element, about said longitudinal axis;

characterized in that said constraint means comprise prismatic connecting means between said movable element and said supporting element.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
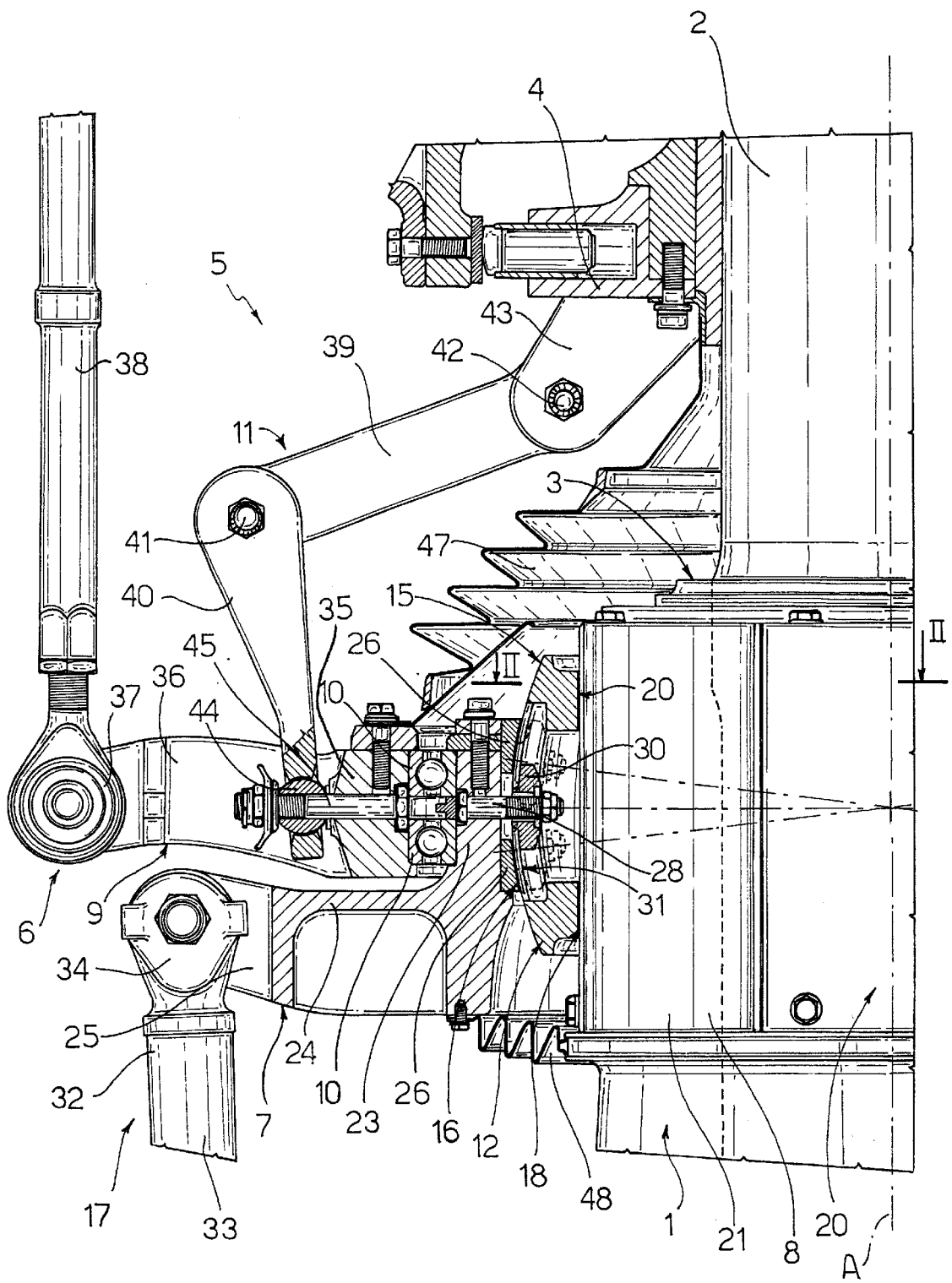
FIG. 1 shows a partly sectioned elevation, with parts removed for clarity, of a cyclic and collective pitch control device for a helicopter rotor, in accordance with the present invention.

The accompanying Figures show a fixed casing or pylon 1 housing a geared motor unit (not shown) for a helicopter rotor (not shown), and which is substantially bell-shaped with an axis of symmetry A.

Casing 1 is fitted through with a tubular drive shaft 2, of axis A, which extends substantially vertically and projects outwards of casing 1 through an opening 3 in the end of the casing. Drive shaft 2 is supported in angularly-free manner inside casing 1 by means of bearings (not shown), is connected angularly at the bottom end to an output member (not shown) of the geared motor unit, and terminates at the opposite end with a flange 4 for connecting a number of blades (not shown) of the rotor.

Casing 1 supports externally a cyclic and collective pitch control device connected in known manner to the rotor blades and indicates as a whole by 5.

Device 5 substantially comprises a rocking-plate assembly 6, of axis A, in turn comprising a first annular element 7 fitted in angularly-fixed manner about a substantially cylindrical top portion 8 of casing 1 and hereinafter referred to as a "fixed ring", and a second annular element 9, which is fitted in rotary manner to fixed ring 7 via the interposition of two bearings 10, is made angularly integral with drive shaft 2 by means of a compass-type connecting mechanism 11, and is hereinafter referred to as a "rotary ring".

Assembly 6 is carried by a substantially sleeve-shaped movable element 12, of axis A, fitted in axially-sliding manner to top portion 8 of casing 1. More specifically, movable element 12 is defined externally by a spherical annular surface 15—hereinafter referred to simply as a "spherical surface"—which mates with a spherical central seat 16 of assembly 6 to enable assembly 6 to rock about axes perpendicular to axis A.

Device 5 also comprises a supporting and actuating assembly 17 interposed between casing 1 and fixed ring 7, and cooperating with fixed ring 7 to move assembly 6 together with movable element 12 along axis A with respect to top portion 8 of casing 1, and to rock assembly 6 as stated with respect to movable element 12 and portion 8.

An important aspect of the present invention is that movable element 12 is connected prismatically to top portion 8 of casing 1, so as to slide axially along portion 8 but not rotate with respect to casing 1.

Figure 2:
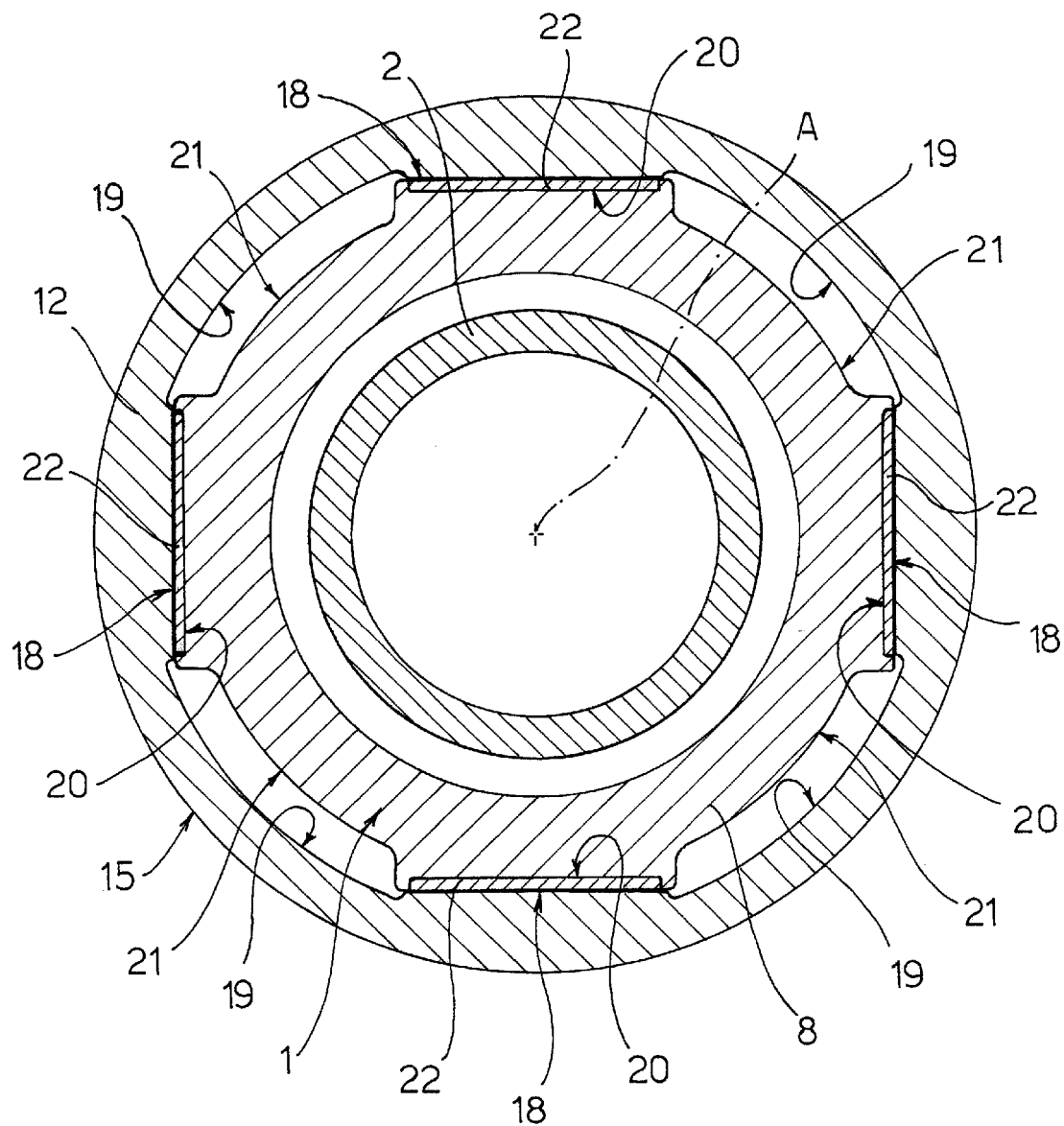
FIG. 2 shows a larger-scale section along line II—II in FIG. 1.

With particular reference to FIG. 2, movable element 12 comprises, internally, a number of—in the example shown, four—flat surfaces 18, which are equally spaced angularly about axis A, alternate with respective cylindrical surface portions 19, and cooperate in sliding manner with respective flat surfaces 20 formed externally on top portion 8 of casing 1 and also alternating with respective cylindrical surface portions 21. More specifically, surfaces 18—and likewise surfaces 20— are arranged in twos parallel to each other; and, between each flat surface 18 of movable element 12 and each flat surface 20 of top portion 8 of casing 1 contacting each other, a respective layer 22 of antifriction material, preferably Teflon, is interposed and fitted by means of screws to top portion 8 of casing 1.

With particular reference to FIG. 1, fixed ring 7 comprises a main portion 23, of axis A, from a bottom end portion of which extend radially outwards a number of arms 24 (only one shown) equally spaced angularly about axis A and terminating with respective fork-shaped end portions 25 for connection to supporting and actuating assembly 17.

Main portion 23 of fixed ring 7 is fitted to spherical surface 15 of movable element 12 via the interposition of two annular elements 26, of axis A, which are located on opposite sides of an intermediate plane of movable element 12 perpendicular to axis A and through the center of spherical surface 15, and the radially inner surfaces of which—also spherical annular surfaces—define seat 16. Respective layers of antifriction material, preferably Teflon, are interposed between annular elements 26 and spherical surface 15 of movable element 12.

Fixed ring 7 is fitted in known manner to movable element 12 by two bolts 28, which are located on diametrically opposite sides of axis A, are fitted through respective radial holes in main portion 23, and each engage a respective key 30 in turn engaging in sliding manner a respective substantially vertical slot 31 formed externally on movable element 12, so that fixed ring 7 is locked angularly to spherical surface 15 of movable element 12 and, by virtue of key 30 and slot 31, is permitted to rock in any direction, with respect to movable element 12, about the center of spherical surface 15.

Supporting and actuating assembly 17 comprises a number of hydraulic actuators 32 (only one shown partly), which have respective axes parallel to axis A, are equally spaced about axis A, and have respective output rods 33, each of which is secured at the top end to a fork-shaped end portion 25 of a respective arm 24 of fixed ring 7 by means of a spherical joint 34.

Rotary ring 9 comprises a main portion 35 fitted radially outwards to main portion 23 of fixed ring 7 via the interposition of bearings 10; and a number of arms 36—equal in number to the rotor blades—extending radially outwards from main portion 35 and each connected by a spherical joint 37 to the bottom end of a respective pitch control rod 38, the top end of which is connected eccentrically to a respective rotor blade.

With reference to FIG. 1, known compass-type connecting mechanism 11 provides for transmitting rotary motion from drive shaft 2 to rotary ring 9, and comprises two connecting rods 39, 40 connected to each other by a cylindrical hinge 41 having an axis perpendicular to axis A. Connecting rod 39 is also connected—at the opposite end to hinge 41 and by means of a further cylindrical hinge 42 having an axis parallel to the axis of hinge 41—to a connecting bracket 43 extending outwards and downwards from flange 4; and connecting rod 40 is connected—at the opposite end to hinge 41 and by means of a spherical joint 44—to a bolt 45 fitted through a radial hole formed in main portion 35 of rotary ring 9.

Finally, respective bellows 48, 47 are provided between casing 1 and the bottom end of fixed ring 7, and between flange 4 and the top end of rotary ring 9, to prevent dust, sand, ice and other external agents from penetrating between drive shaft 2 and casing 1, between casing 1 and movable element 12, between movable element 12 and assembly 6, and between fixed and rotary rings 7, 9.

The way in which rods 33 of actuators 32, rocking-plate assembly 6, movable element 12 and rods 38 provide for adjusting as required the cyclic and collective pitch of the rotor blades is known and therefore needs no further explanation.

Needless to say, device 5 described—which is a so-called "external control" type, i.e. located outside casing 1 and drive shaft 2—may easily be replaced by any skilled technician with a known so-called "internal control" cyclic and collective pitch control device (not shown) wherein assembly 6 and movable element 12 are fitted in sliding manner to a fixed supporting element inside drive shaft 2.

The advantages of device 5 according to the present invention will be clear from the foregoing description.

In particular, providing casing 1 with four flat surfaces 20 mating in sliding manner with respective flat surfaces 18 on movable element 12 provides for guiding assembly 6 and movable element 12 along axis A, while at the same time preventing assembly 6 from rotating with respect to casing 1, with no need for compass-type connecting mechanisms, thus reducing weight, cost and the number of component parts, and improving reliability as compared with known control devices.

Moreover, using four pairs of contacting flat surfaces (18, 20), the constraint redundancy requirement governing the vertical slide function of the assembly defined by movable element 12 and fixed and rotary rings 7, 9 is met with no increase in the total weight of device 5.

Finally, as compared with known control devices, eliminating the compass-type connecting mechanism between fixed ring 7 and casing 1 provides for more easily accommodating bellows 48.

Clearly, changes may be made to device 5 as described and illustrated herein without, however, departing from the scope of the accompanying claims.

In particular, movable element 12 and top portion 8 of casing 1 may have respective prismatic mating surfaces, i.e. with no cylindrical portions.

What is claimed is:

1. A cyclic and collective pitch control device (5) for a helicopter rotor fitted to a drive shaft (2) having a longitudinal axis (A); said device (5) being carried by a fixed supporting element (1) coaxial with said longitudinal axis (A), and comprising:

a movable element (12) coaxial with said longitudinal axis (A) and fitted in axially-sliding manner to said supporting element (1), said movable element (12) being substantially sleeve-shaped;

a rocking-plate assembly (6) coaxial with said longitudinal axis (A), fitted to said movable element (12) so as to rock, with respect to the movable element, about transverse axes substantially perpendicular to said longitudinal axis (A), and in turn comprising an angularly-fixed first annular element (7), and a second annular element (9) rotating on said first annular element (7) together with said drive shaft (2);

supporting and actuating means (17) cooperating with said first annular element (7) to move said rocking-plate assembly (6) and said movable element (12) jointly along said longitudinal axis (A) with respect to said supporting element (1), and to rock said assembly (6), with respect to said movable element (12), about said transverse axes; and constraint means (18, 20) for preventing angular displacement of said movable element (12), with respect to said supporting element (1), about said longitudinal axis (A);

said constraint means comprise prismatic connecting means (18, 20) between said movable element (12) and said supporting element (1); and said prismatic connecting means comprise four first flat surfaces (18) arranged in twos parallel to each other which are formed internally on said movable element (12) and equally spaced about said longitudinal axis (A), and cooperate in sliding manner with respective second flat surfaces (20) formed externally on said supporting element (1).

2. A device as claimed in claim 1, wherein said first and second flat surfaces (18, 20) alternate with respective first and second cylindrical portions (19, 21).

3. A device as claimed in claim 1, wherein a respective layer of antifriction material (22) is interposed between each said first and second flat surface (18, 20) contacting each other.

4. A device as claimed in claim 1, wherein said movable element (12) is defined externally by a substantially spherical surface (15) mating with a spherical seat (16) of said first annular element (7).

5. A device as claimed in claim 1, wherein said supporting and actuating means (17) comprise a number of hydraulic actuators (32) having axes parallel to said longitudinal axis (A), equally spaced about said longitudinal axis (A), and having respective output rods (33) secured peripherally to said first annular element (7) by respective spherical joints (34).

6. A device as claimed in claim 1, wherein said supporting element is a casing (1) fitted through with said drive shaft (2) and housing a geared motor unit for activating said rotor.

* * * * *

UNITED STATES PATENT AND TRADEMARK OFFICE
CERTIFICATE OF CORRECTION

PATENT NO. : 6,325,326 B1  Page 1 of 1
DATED : December 4, 2001
INVENTOR(S) : Santino Pancotti It is certified that error appears in the above-identified patent and that said Letters Patent is hereby corrected as shown below:

<u>Title page,</u>
Item [73] Assignee: Augusta S.p.A. (IL) to -- Augusta S.p.A. (IT) --

Signed and Sealed this

Twenty-first Day of May, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,325,326 B1
DATED         : December 4, 2001
INVENTOR(S)   : Santino Pancotti It is certified that error appears in the above-identified patent and that said Letters Patent is hereby corrected as shown below:

<u>Title page,</u>
Item [73], change "[73] Assignee: Agusta S.p.A. (IL)" to
-- [73] Assignee: Agusta S.p.A. (IT) --

Signed and Sealed this

Seventeenth Day of December, 2002

JAMES E. ROGAN
*Director of the United States Patent and Trademark Office*